Patented Aug. 9, 1932

1,870,627

UNITED STATES PATENT OFFICE

ERNEST H. HUNTRESS, OF CAMBRIDGE, MASSACHUSETTS, ASSIGNOR TO SWANN RESEARCH, INC., A CORPORATION OF ALABAMA

PREPARATION OF TETRANITRODIPHENYL

No Drawing. Application filed January 27, 1930. Serial No. 423,908.

This invention relates to a method for preparing tetra nitrodiphenyl from diphenyl and nitric acid, and has for its object the provision of a method, whereby the nitration may be carried out without the simultaneous sulphonation of the diphenyl.

Previous methods for preparing tetra nitrodiphenyl have comprised the direct nitration of diphenyl or the lower nitrodiphenyls with nitric acid and fuming sulphuric acid. Fuming sulphuric acid is 100 per cent $H_2SO_4$ containing dissolved $SO_3$ up to 45 per cent of its weight. The use of fuming sulphuric acid in the nitrating mixture results in a lowered yield of the desired product by the formation of diphenyl sulphonic acid which is difficult to remove from the tetra nitrodiphenyl.

Furthermore, when fuming sulphuric acid is used, some oxidation usually occurs which still further lowers the yield and also contaminates the material with the oxidation product.

I have now found that the nitration may be more efficiently carried out with considerably better yields by the use of concentrated sulphuric acid in the nitrating mixture in place of fuming acid. "Concentrated sulphuric acid", as herein described, contains about 96 per cent $H_2SO_4$ and 4 per cent of water.

The following examples illustrate various ways in which my invention may be carried out.

*Example I.*—To 40 cc. of nitric acid of specific gravity 1.5, add 10 grams of powdered diphenyl, with constant stirring, keeping the temperature below 20° C. by appropriate cooling. Now add 50 cc. of concentrated sulphuric acid of specific gravity 1.84. When all the acid has been added, heat on a water bath for one-half hour, then pour into ice water. Filter off the precipitate, wash with 1% sodium hydroxide, and dry. It will be found that a 100 per cent yield of crude tetranitrodiphenyl will have been obtained.

In order to obtain a pure product, one proceeds as follows: Dissolve the crude tetranitrodiphenyl in benzol, using 3 cc. for each gram of crude material. Filter the solution hot, allow the benzene solution to cool. A yield of 50 to 60 per cent of pure 2, 4, 2′, 4′ nitrodiphenyl is obtained.

Another method for working my invention is as follows:

*Example II.*—Prepare a mixture of 50 cc. of nitric acid (1.5 specific gravity) and 50 cc. concentrated sulphuric acid (1.84 specific gravity). Heat the mixed acids to 100° C. and gradually add 10 grams of powdered diphenyl. Heat to 120° C. for half an hour. Pour into cold water, filter and dry. A yield of between 90 and 100 per cent of crude tetranitrodiphenyl is obtained. Purification may be carried out as in Example I by recrystallization from benzol solution.

The proportions of nitric and sulphuric acids to diphenyl may be somewhat varied without greatly altering the yield of the tetranitro compound. I find, however, that if the proportion of nitric acid to diphenyl is considerably reduced, a lower nitration product is obtained. Furthermore, I have found that if the diphenyl and the sulphuric acid are first mixed together and the nitric acid is then added, the desired nitration is not obtained, the product consisting mainly of a sulphonic acid derivative of diphenyl.

Instead of starting with diphenyl, I may start with either of the mononitro derivatives, 4-nitrodiphenyl or 2-nitrodiphenyl, and nitrate by the use of my procedure so as to obtain the tetranitro-compound.

What I claim is:—

The method of preparing 2, 4, 2′, 4′ tetranitrodiphenyl in one step, comprising reacting together diphenyl and nitric acid in the proportions of 10 grams of diphenyl to 40 cc. of nitric acid of specific gravity 1.5, in the presence of 50 cc. of sulphuric acid of specific gravity 1.84.

In testimony whereof I affix my signature.

ERNEST H. HUNTRESS.